US010377271B2

(12) United States Patent
Bruck

(10) Patent No.: US 10,377,271 B2
(45) Date of Patent: Aug. 13, 2019

(54) RELEASE LATCH INCORPORATED INTO A REAR WALL OF A VEHICLE SUCH AS A TRUCK CAB

(71) Applicant: BAE Industries, Inc., Auburn Hills, MI (US)

(72) Inventor: Stephen C. Bruck, Howell, MI (US)

(73) Assignee: BAE INDUSTRIES, INC., Auburn Hills, MI (US)

( * ) Notice: Subject to any disclaimer, the term of this patent is extended or adjusted under 35 U.S.C. 154(b) by 76 days.

(21) Appl. No.: 15/637,522

(22) Filed: Jun. 29, 2017

(65) Prior Publication Data

US 2018/0001792 A1 Jan. 4, 2018

Related U.S. Application Data

(60) Provisional application No. 62/356,318, filed on Jun. 29, 2016.

(51) Int. Cl.
| B60N 2/08 | (2006.01) |
| B60N 2/015 | (2006.01) |
| B60N 2/30 | (2006.01) |
| B60N 2/28 | (2006.01) |
| B60N 2/36 | (2006.01) |

(52) U.S. Cl.
CPC ....... B60N 2/0825 (2013.01); B60N 2/01583 (2013.01); B60N 2/0856 (2013.01); B60N 2/2809 (2013.01); B60N 2/366 (2013.01); B60N 2/3079 (2013.01)

(58) Field of Classification Search
CPC ............. B60N 2/0825; B60N 2/0856; B60N 2/01583; B60N 2/2809; B60N 2/3079
See application file for complete search history.

(56) References Cited

U.S. PATENT DOCUMENTS

| 4,813,722 A | 3/1989 | Viscome et al. |
| 6,676,198 B2 | 1/2004 | Demptos et al. |
| 6,733,078 B1 | 5/2004 | Zelmanov |
| 7,281,742 B2 | 10/2007 | Porter, II et al. |
| 8,777,315 B2 | 7/2014 | Lutzka et al. |
| 9,260,041 B2 * | 2/2016 | Muddana ............... B60N 2/366 |

(Continued)

FOREIGN PATENT DOCUMENTS

| DE | 202014102529 U1 | 7/2014 |
| EP | 1413473 A1 | 4/2004 |

(Continued)

*Primary Examiner* — D Glenn Dayoan
*Assistant Examiner* — Melissa A Black
(74) *Attorney, Agent, or Firm* — Dinsmore & Shohl, LLP

(57) ABSTRACT

The present invention discloses a latch for securing a seatback to an elevated rear wall of a vehicle passenger compartment, and in which a striker having a crosswise engaging portion extends rearwardly from the seatback. The latch includes a fixed sector adapted to being mounted to the rear wall. A hook is pivotally supported to the sector, with a slide plate sandwiching the hook between the slide plate and the fixed sector such that upward displacement of the slide plate causes forward pivoting of the hook. Rearward pressing of the seatback and striker causes rearward rotation of the hook to receive the striker, the slide plate being upwardly displaced to cause forward rotation of the hook to disengage the striker.

17 Claims, 7 Drawing Sheets

(56) References Cited

U.S. PATENT DOCUMENTS

| | | |
|---|---|---|
| 2004/0119317 A1 | 6/2004 | Wulf et al. |
| 2009/0026790 A1 | 1/2009 | O'Connor et al. |
| 2009/0230745 A1* | 9/2009 | Jovicevic ............. B60N 2/2209 297/341 |
| 2014/0327266 A1 | 11/2014 | Gholap et al. |
| 2015/0137547 A1 | 5/2015 | Cai et al. |

FOREIGN PATENT DOCUMENTS

| | | |
|---|---|---|
| EP | 1413473 B1 | 2/2010 |
| EP | 2957454 A2 | 12/2015 |
| FR | 2885562 B1 | 7/2007 |
| FR | 2911546 A1 | 7/2008 |
| WO | 2007136119 A1 | 11/2007 |
| WO | 2015074136 A9 | 4/2016 |

\* cited by examiner

RELEASE LATCH INCORPORATED INTO A REAR WALL OF A VEHICLE SUCH AS A TRUCK CAB

CROSS REFERENCE TO RELATED APPLICATIONS

The present application claims the priority of U.S. Ser. No. 62/356,318 filed Jun. 29, 2016.

BACKGROUND OF THE INVENTION

Field of the Invention

A truck cab wall latch adapted to engage an upper rear of a fixed truck seatback. A striker extends from an upper rear extending location of the upper seatback, the latch assembly secured to the rear wall in a manner in which the striker can be compressed into engagement with a pivotally associated hook. When it is desired to access for service behind the seatback, a separate tool is inserted through a gap between the seatback and wall which engages an underside shoulder location of a spring biased and vertically displaceable slide, such in turn pivoting the hook about fixed support sector and effectuating disengagement of the hook from the striker. As further illustrated, a three layer sandwiched arrangement of the truck cab wall latch includes a fixed sector in orange, an intermediate pivoting hook in yellow and an outer slide plate in blue.

Description of the Background Art

The prior art discloses a number of release or fold down assemblies for a seatback. An example of this is the improved locking device of Viscome, U.S. Pat. No. 4,813,722, for a latching and locking mechanism, wherein upon a motor vehicle rear seatback being unlocked it is adapted to be unlatched for swinging to a fold-down position by pivoting a handle portion of an operating lever providing pass through access between the vehicle passenger compartment and rear storage trunk. The locking device provides a key locking cylinder which in its locked mode has a lock bar biased in one direction such that its one end contacts a cam segment on the cylinder. The lock bar is formed with a pair of notches spaced on centers equal to the spacing between support webs of a pivoting operating lever. The notches are positioned to block the pivoting of the lever in the cylinder locked mode by being misaligned with the support webs. Upon the lock bar being shifted by the cam segment, as a result of the cylinder being rotated by the key, the notches are aligned with the support webs allowing latch tripping movement of the operating lever probe to free the striker allowing the backrest to be swung to its fold-down unlatched position.

CAI et al., US 2015/0137547, teaches a vehicle seatback stabilization device including a seatback stabilization portion to be connected to a seatback and a vehicle body connection portion including an aperture to receive a connector of a vehicle body load-bearing structure. The seatback stabilization portion may include first and second stabilization panels positioned with an angle relative to each other. The vehicle body connection portion may extend away from the second stabilization panel such that the second stabilization panel is positioned between the first stabilization panel and the vehicle body connection portion.

Gholap, US 2014/0327266, teaches a vehicle seat assembly adjacent a vehicle body panel, the assembly including a vehicle seat that has a seat bottom a pivotally associated seat back. The vehicle seat assembly includes a striker assembly with a fixed striker fixed to the vehicle body panel and a pivotable striker pivotally supported on the fixed striker. The pivotable striker is pivotable between a first position in which the pivotable striker extends further than the fixed striker toward the seat back, and a second position in which the fixed striker extends further than the pivotable striker toward the seat back. A latching mechanism fixed to the seat back latches to the pivotable striker when the pivotable striker is in the first position, and latches to the fixed striker when the pivotable striker is in the second position.

SUMMARY OF THE PRESENT INVENTION

The present invention discloses a latch for securing a seatback to an elevated rear wall of a vehicle passenger compartment, and in which a striker having a crosswise engaging portion extends rearwardly from the seatback. The latch includes a fixed sector adapted to being mounted to the rear wall. A hook is pivotally supported to the sector, with a slide plate sandwiching the hook between the slide plate and the fixed sector such that upward displacement of the slide plate causes forward pivoting of the hook. Rearward pressing of the seatback and striker causes rearward rotation of the hook to receive the striker, the slide plate being upwardly displaced to cause forward rotation of the hook to disengage the striker.

Additional features include the vehicle passenger compartment being a truck cab, the seatback adapted to being bolted to a floor so that the seatback extends at an angle relative to the rear wall, a minimal gap existing between an upper rear edge of the seatback and the truck cab wall. A child seat tether extends from a support location of the latch, the tether adapted to engaging an infant or child carrier which may be supported upon the seat.

The sector, hook and slide plate can each further include a plate shape stacking arrangement, each being constructed of a grade steel. The slide plate further includes an uppermost curved and underside catch engaging portion with a top accessible curved underside profile. A first pin shaft extends from the fixed sector, through a mounting aperture in the plate shaped hook and into an elongated and vertically directed slot configured in the slide plate. The first pin shaft further includes an enlarged head which seats against an exposed face of the slide plate in sliding contact over the slot.

A coil spring with a first end engages an upper location of the slide and a second end engages a bottom shelf of the fixed sector, this in order to bias the slide plate in a downward direction to maintain the hook in a rear pivoted and engaging relationship with the striker. A second elongated and vertically directed slot extends along the fixed sector, the slot being in general linear alignment and elevated above the slide plate configured slot.

A second pin including a shaft extends from a mounting location of the slide plate, through an upper configured shoulder in the hook, and into the second slot. The second pin shaft concludes in an enlarged head which seats against an exposed face of the fixed sector opposite the exposed face of the slide plate in sliding contact over the second slot. A tool having a configured engaging tip is inserted through the gap between the seatback and wall, and which engages the slide plate for displacing upwardly against the bias force of the spring.

BRIEF DESCRIPTION OF THE DRAWINGS

Reference will now be made to the attached drawing, when read in combination with the following detailed description, wherein like reference numerals refer to like parts throughout the several views, and in which.

DETAILED DESCRIPTION OF THE PREFERRED EMBODIMENTS

Figure 1:
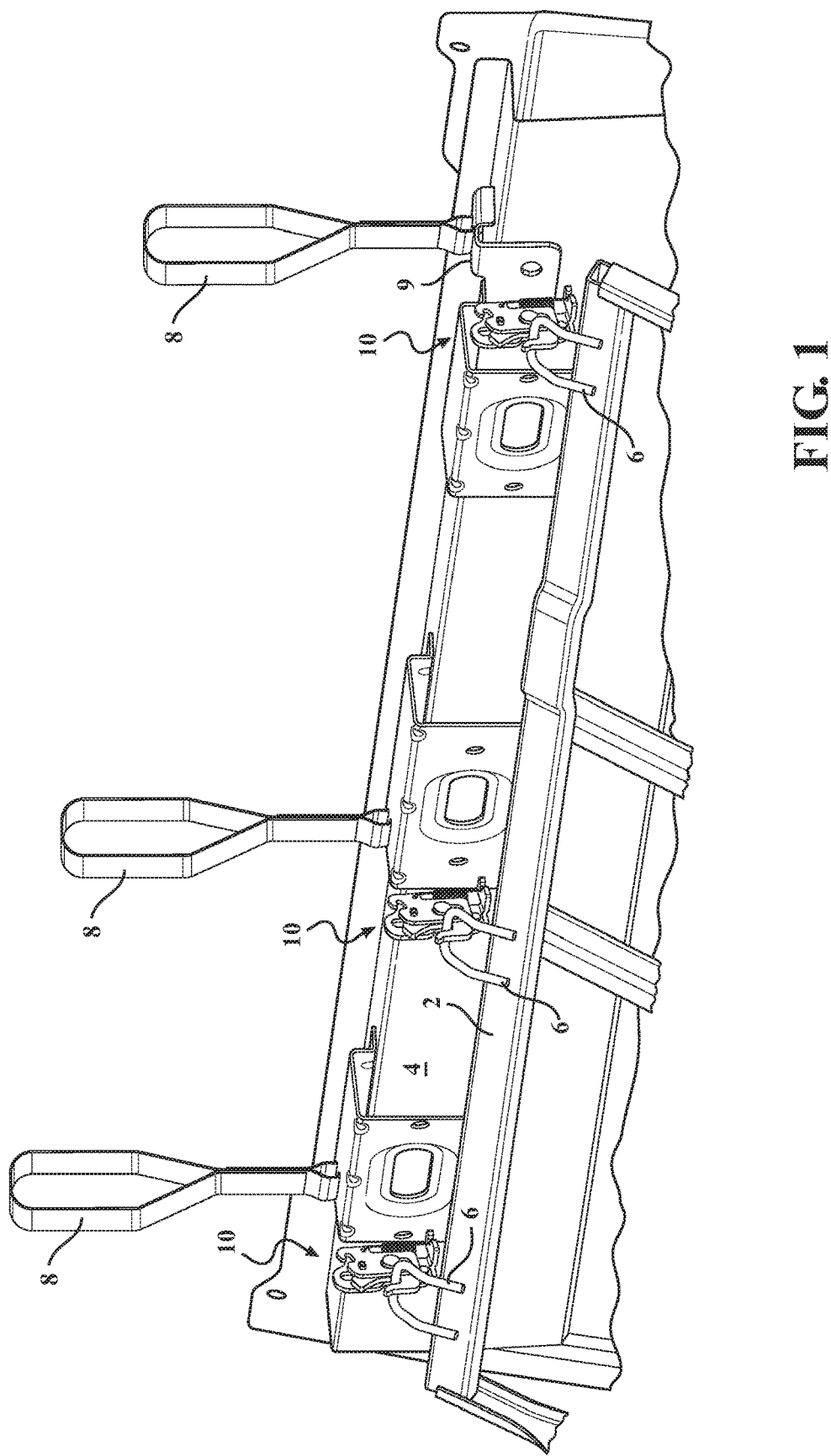
FIG. 1 is a perspective illustration of a seatback frame with rearwardly facing and supported striker in combination with a rear cab wall supported latch according to the present invention.

As will be described in further detail, a truck cab wall latch, generally at 10, is provided for engaging an upper rear of a seatback, see frame at 2, of a typically fixed truck seatback. As is further understood, the seatback 2 is usually bolted to a floor of the vehicle (not shown) and so that seatback extends at an angle relative to a rear wall, see at 4 in FIG. 1, of the vehicle interior (such as a truck cab rear wall), a minimal gap existing between an upper rear edge of the seatback 2 and the truck cab wall 4.

A striker 6, depicted as a curved and generally "U" shaped member, is shown which extends from an upper rear extending location of the upper seatback 2. The striker 6 is typically welded to the seatback in a manner so that it extends in the general direction of the latch assembly 10 secured to the rear wall 4, and in a manner in which the striker can be compressed into engagement with a pivotally associated hook 12 (FIG. 1A) associated with the latch. Also depicted at 8 is a child seat tether which extends from a support location 9 of the latch, the tether 8 adapted to engaging an infant or child carrier which may be supported upon the rear truck seat assembly.

Figure 1A:
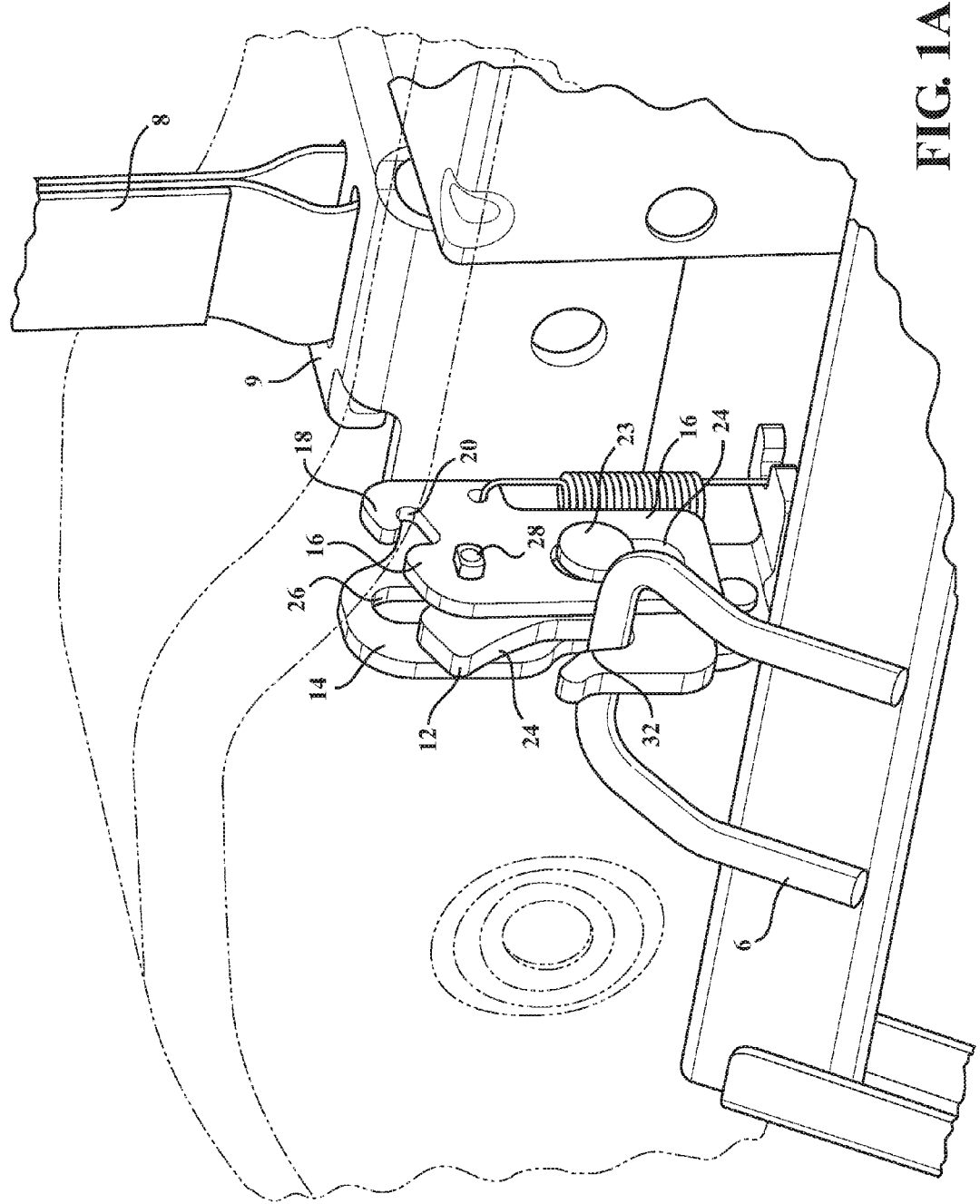
FIG. 1A is an enlarged view of FIG. 1 and showing the inter-engagement of the striker with the latch.

As further shown in the attached illustrations, a three layer sandwiched arrangement of the truck cab wall latch 10 includes a fixed sector 14 which is integrally secured to the mounting support location 9. Stacked upon the fixed sector 14 is the intermediately positioned pivoting hook 12 and an outer slide plate 16. The fixed sector 14 and hook 12, along with the slide plate 16, are generally plate shaped (typically constructed of a grade steel) and, as best shown in the perspective view of FIG. 1A, illustrate the three components assembled in a stacked or sandwiched relationship, with the hook 12 being interposed between the fixed sector 14 and the slide plate 16.

Figure 2:
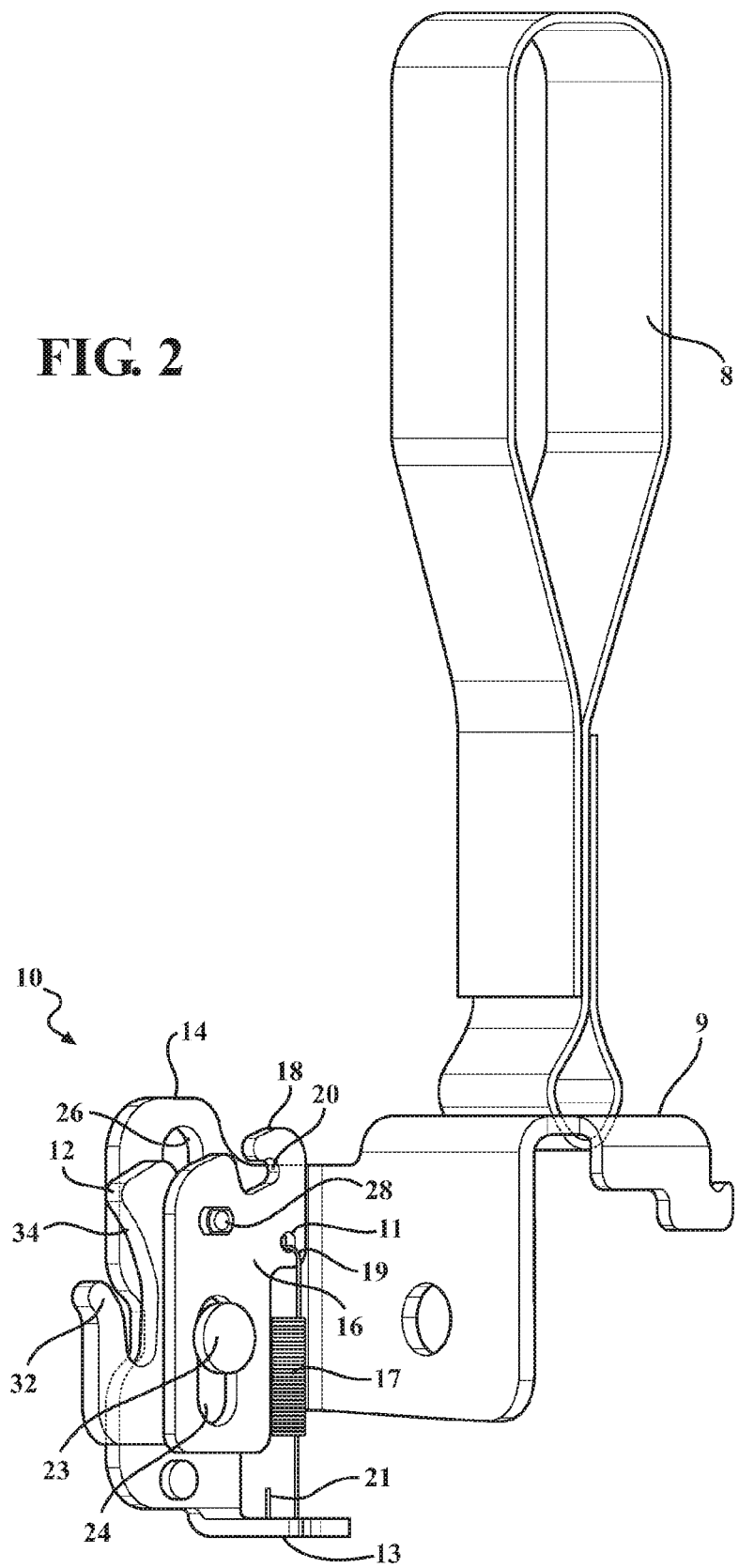
FIG. 2 is a sectional perspective of the latch removed from the rear cab wall and illustrating an optional child seat tether.
Figure 3:
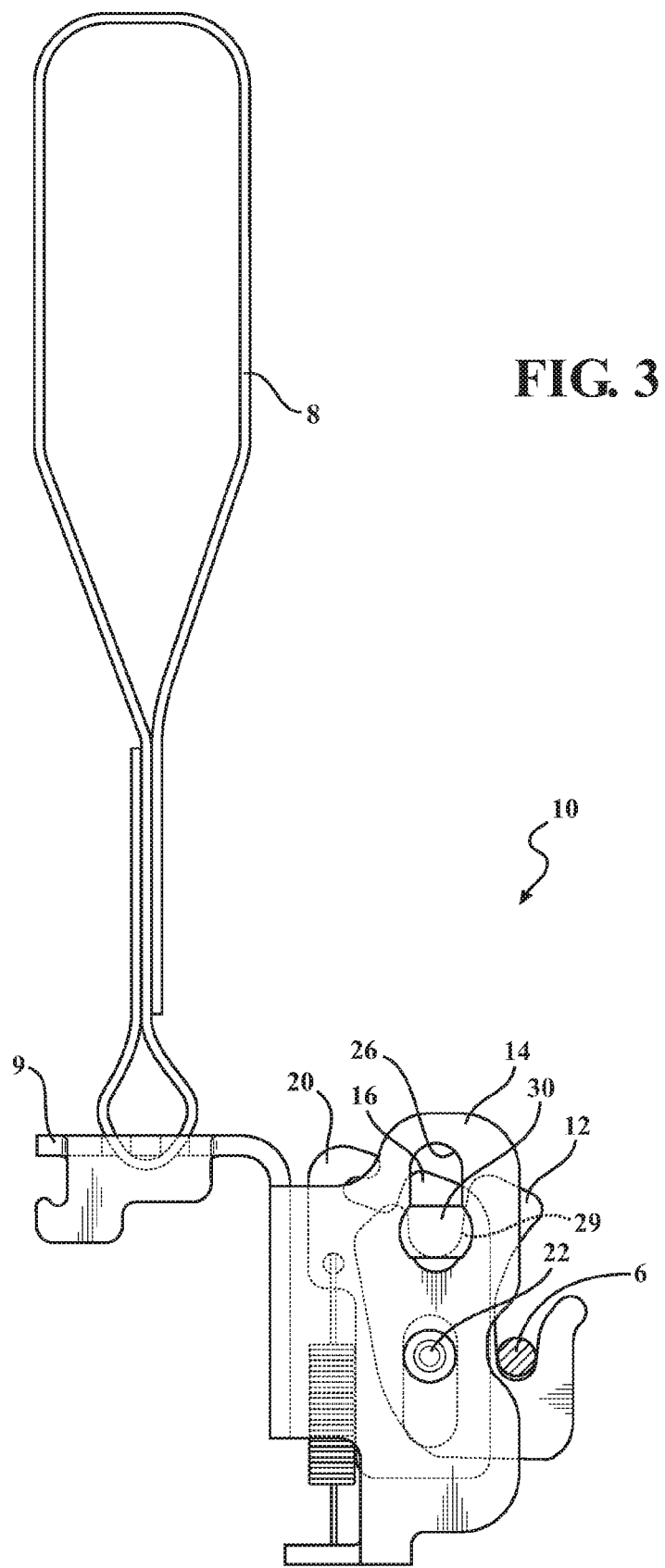
FIG. 3 is a right side plan view of the latch of FIG. 2.

As best shown in the enlarged view of FIG. 2, the slide plate 16 includes an uppermost curved and underside catch engaging portion, this depicted by uppermost portion 18 with top accessible curved underside profile 20. A first pin shaft 22 (see in rotated FIG. 3 cutaway) extends from the fixed sector 14, through a mounting aperture of the hook 12 (see FIG. 4) and into an elongated and vertically directed slot (see inner closed rim 24) of the slide plate 16.

The pin shaft 22 concludes in an enlarged head 23 (best shown in FIGS. 1A and 2) which seats against an exposed face of the slide plate 16 in sliding contact over the inner rim 24 defining slot. As also best shown in FIG. 5, a coil spring 17 is provided with a first end 19 engaging an upper location (see interior aperture defining perimeter rim 11) of the slide 16 and a second end 21 engaging a bottom shelf 13 of the fixed sector 14, this in order to bias the slide plate 16 in a downward direction (see arrow 15) to maintain the hook 12 in a rear pivoted and engaging relationship with the striker 6.

A second elongated and vertically directed slot, see inner perimeter defining rim 26, extends along the fixed sector 14, the rim defined slot 26 being in general linear alignment and elevated above the slide plate configured slot 24 as again best shown in FIG. 2. A second pin includes a shaft 28 extending from a mounting location of the slide plate 16, through an upper configured shoulder 29 in the hook 12, and into the second slot 26. The second pin shaft 28 concludes in an enlarged head 30 (see FIG. 3) which seats against an exposed face of the fixed sector 14 (opposite the exposed face of the slide plate) in sliding contact over the slot 26.

Figure 4:
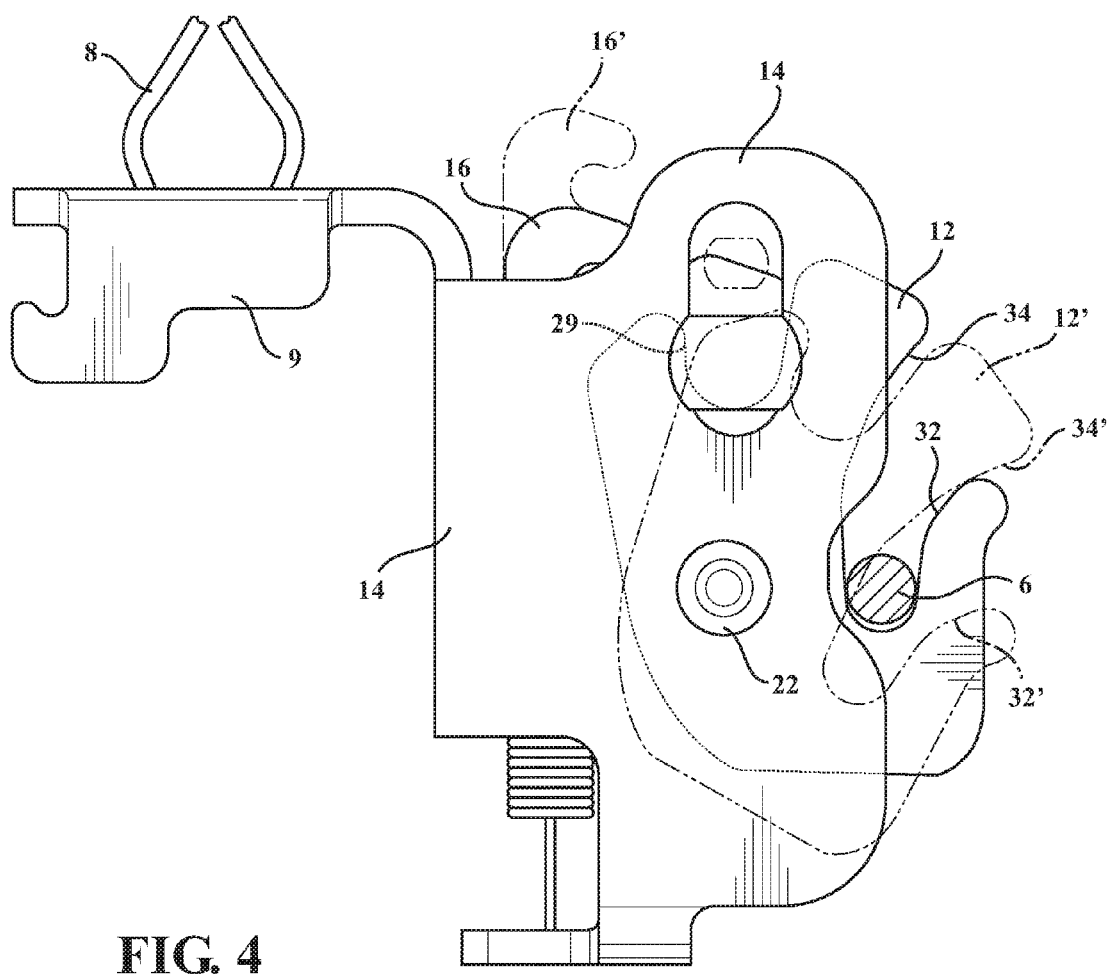
FIGS. 4 and 5 are right and left side views of the hook in both engaged and released positions relative to the striker.
Figure 5:
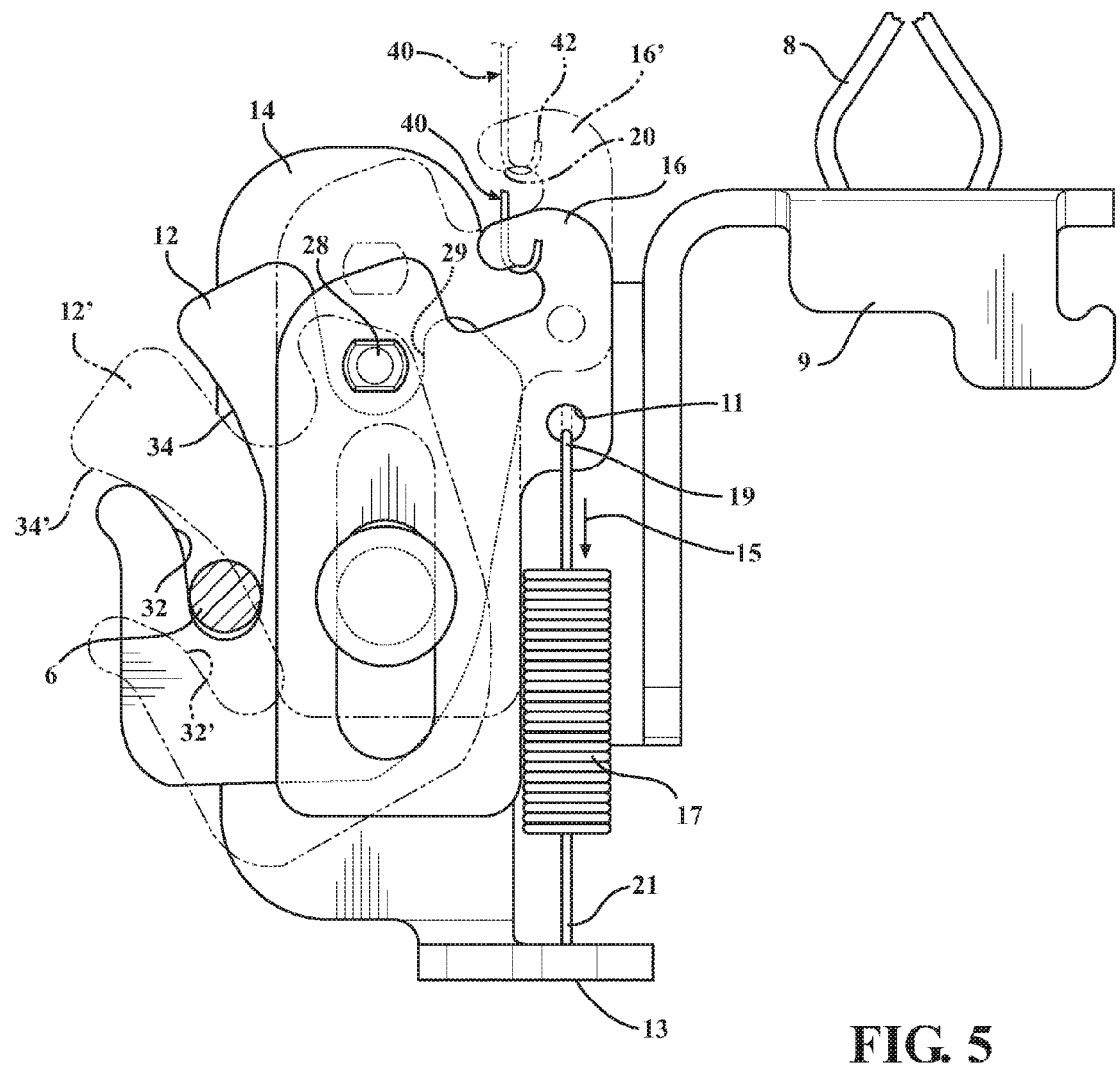

In a first engaging configuration (see again FIG. 1A) the rear facing seatback striker 6 (again FIG. 1) is pressed against the latch and compress the hook 12, causing the same to pivot into engagement with the striker 6 through an access location, see as defined by passageway surfaces 32/34 of the hook 12 which define an inner catch location as best shown FIGS. 4 and 5 for fixing to the striker 6.

Figure 6:
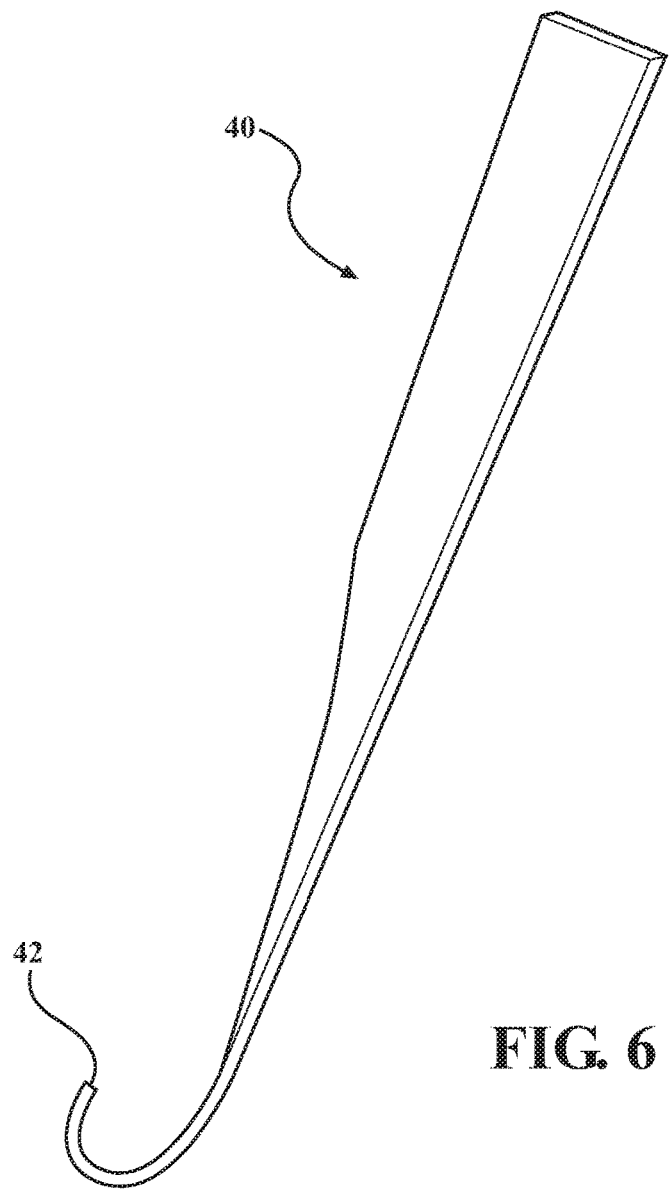
FIG. 6 is an illustration of a separate tool having a generally elongated body with a curled engaging tip which is inserted through the gap between the seatback and wall, and which engages the underside shoulder location of the spring biased and vertically displaceable slide plate 16, causing the slide plate to displace upwardly against the bias force of the spring.

When it is desired to access for service behind the seatback, a separate tool forming a portion of an assembly including the latch, this generally shown at 40 in FIG. 6 as a generally elongated body with a thin or flattened profile to account for the narrow spacing between the seatback and wall, the tool 40 having a curled engaging tip 42, is inserted through the gap between the seatback 2 and wall 4. The tip 42 engages the underside shoulder location 20 of the spring biased and vertically displaceable slide plate 16 (see also FIG. 5), with subsequent upward motion causing the slide plate 16 to displace upwardly against the bias force of the spring 17 (see positions 16 and 16' of FIG. 4). The upward travel of the slide plate 16 in turn causes the second shaft pin 28 to displace upwardly along the vertical track 26 in the fixed sector 14, this in turn coacting against the upper configured shoulder 29 of the hook 12, resulting in the hook pivoting forwardly from position 12 to 12' (see each of FIGS. 4 and 5), the range of forward pivoting of the hook about the fixed support sector 14 effectuating disengagement of the hook from the striker by allowing retraction of the crosswise extending striker portion 6 from the forward tilted passageway in the hook depicted at 32'/34' in FIGS. 4 and 5.

The bottom of the seatback 2 (not shown) can be bolted or pivotally supported to the floor of the vehicle. In either instance, and upon re-securing any associated floor mounts, the seatback frame 2 is again pressed rearwardly to seat the striker 6, which pivots the hook 12 to the upwardly/rearwardly rotated position in combination with the spring influencing bias of the slide plate 16.

Having described our invention, other and additional preferred embodiments will become apparent to those skilled in the art to which it pertains, and without deviating from the scope of the appended claims.

I claim:

1. A latch for securing a seatback to an elevated rear wall of a truck cab, a striker having a crosswise engaging portion and extending rearwardly from the seatback, said latch comprising:

a fixed sector adapted to being mounted to the rear wall;
the seatback adapted to being bolted to a floor so that the seatback extends at an angle relative to the rear wall, a minimal gap existing between an upper rear edge of the seatback and the truck cab wall;
a hook pivotally supported to said sector, a slide plate sandwiching said hook between said slide plate and fixed sector such that upward displacement of said slide plate causes forward pivoting of said hook;
said slide plate further having an uppermost curved and underside catch engaging portion with a top accessible curved underside profile;
a coil spring with a first end engaging an upper location of said slide plate and a second end engaging a bottom shelf of the fixed sector, this in order to bias said slide plate in a downward direction to maintain said hook in a rear pivoted and engaging relationship with the striker; and
rearward pressing of the seatback and striker causing rearward rotation of said hook to receive the striker, said slide plate being upwardly displaced to cause forward rotation of said hook to disengage the striker.

2. The latch as described in claim 1, further comprising a child seat tether which extends from a support location of the latch, the tether adapted to engaging an infant or child carrier which may be supported upon the seat.

3. The latch as described in claim 1, said sector, hook and slide plate each further comprising a plate shape stacking arrangement, each being constructed of a grade steel.

4. The latch as described in claim 3, further comprising a first pin shaft extending from said fixed sector, through a mounting aperture in said plate shaped hook and into an elongated and vertically directed slot configured in said slide plate.

5. The latch as described in claim 4, said first pin shaft further comprising an enlarged head which seats against an exposed face of said slide plate in sliding contact over said slot.

6. The latch as described in claim 5, further comprising a second elongated and vertically directed slot extending along said fixed sector, said slot being in general linear alignment and elevated above said slide plate configured slot.

7. The latch as described in claim 6, further comprising a second pin including a shaft extending from a mounting location of said slide plate, through an upper configured shoulder in said hook, and into said second slot.

8. The latch as described in claim 7, further comprising said second pin shaft concluding in an enlarged head which seats against an exposed face of said fixed sector opposite said exposed face of said slide plate in sliding contact over said second slot.

9. The latch as described in claim 1, further comprising a tool having a configured engaging tip inserted through the gap between the seatback and wall, and which engages the slide plate for displacing upwardly against the bias force of said spring.

10. A latch assembly for securing a seatback to an elevated rear wall of a vehicle passenger compartment, a striker having a crosswise engaging portion and extending rearwardly from the seatback, said assembly comprising:
a latch having a fixed sector adapted to being mounted to the rear wall;
a hook pivotally supported to said sector;
a slide plate sandwiching said hook between said slide plate and fixed sector, said slide plate having an underside catch engaging portion with a top accessible underside profile;
a tool having a configured engaging tip which is adapted to being inserted through a gap between the seatback and wall, said tip engaging the slide plate such that upward displacement of said slide plate causes forward pivoting of said hook; and
rearward pressing of the seatback and striker causing rearward rotation of said hook to receive the striker, said slide plate being upwardly displaced to cause forward rotation of said hook to disengage the striker.

11. The latch assembly as described in claim 10, said sector, hook and slide plate each further comprising a plate shape stacking arrangement, each being constructed of a grade steel.

12. The latch assembly as described in claim 11, further comprising a first pin shaft extending from said fixed sector, through a mounting aperture in said plate shaped hook and into an elongated and vertically directed slot configured in said slide plate.

13. The latch assembly as described in claim 12, said first pin shaft further comprising an enlarged head which seats against an exposed face of said slide plate in sliding contact over said slot, a second elongated and vertically directed slot extending along said fixed sector, said slot being in general linear alignment and elevated above said slide plate configured slot.

14. The latch assembly as described in claim 10, further comprising a coil spring with a first end engaging an upper location of said slide plate and a second end engaging a bottom shelf of the fixed sector to bias said slide plate in a downward direction to maintain said hook in a rear pivoted and engaging relationship with the striker.

15. The latch assembly as described in claim 13, further comprising a second pin including a shaft extending from a mounting location of said slide plate, through an upper configured shoulder in said hook, and into said second slot.

16. The latch assembly as described in claim 15, further comprising said second pin shaft concluding in an enlarged head which seats against an exposed face of said fixed sector opposite said exposed face of said slide plate in sliding contact over said second slot.

17. A latch for securing a seatback to an elevated rear wall of a truck cab of a vehicle passenger compartment, the seatback adapted to being bolted to a floor so that the seatback extends at an angle relative to the rear wall, a minimal gap existing between an upper rear edge of the seatback and the truck cab wall, a striker having a crosswise engaging portion and extending rearwardly from the seatback, said latch comprising:
a fixed sector adapted to being mounted to the rear wall;
a hook pivotally supported to said sector, a slide plate sandwiching said hook between said slide plate and fixed sector such that upward displacement of said slide plate causes forward pivoting of said hook;
an elongated slot defined in said slide plate, a pin shaft extending from said fixed sector through a mounting aperture in said hook and through said elongated slot so that an enlarged head of said pin shaft supports against said slide plate;
said sector, hook and slide plate each further having a plate shape in a stacking arrangement;
said slide plate being biased, via a coil spring extending between said slide plate and said fixed sector; and rearward pressing of the seatback and striker causing rearward rotation of said hook to receive the striker, said slide plate being upwardly displaced against a bias of said coil spring to cause forward rotation of said hook to disengage the striker.

\* \* \* \* \*